United States Patent
Dreezen et al.

(10) Patent No.: US 9,589,693 B2
(45) Date of Patent: Mar. 7, 2017

(54) ELECTRICALLY CONDUCTIVE ADHESIVES

(71) Applicant: HENKEL AG & CO. KGAA, Duesseldorf (DE)

(72) Inventors: Gunther Dreezen, Balen-Olmen (BE); Liesbeth Theunissen, Wilsele (BE); Cindy Van der Borght, Geel (BE)

(73) Assignee: HENKEL AG & CO. KGAA, Duesseldorf (DE)

( * ) Notice: Subject to any disclaimer, the term of this patent is extended or adjusted under 35 U.S.C. 154(b) by 729 days.

(21) Appl. No.: 13/796,557

(22) Filed: Mar. 12, 2013

(65) Prior Publication Data

US 2013/0189513 A1 Jul. 25, 2013

Related U.S. Application Data

(63) Continuation of application No. PCT/EP2011/066207, filed on Sep. 19, 2011.

(30) Foreign Application Priority Data

Sep. 20, 2010 (EP) .................................. 10177584

(51) Int. Cl.
| | |
|---|---|
| *H01B 1/02* | (2006.01) |
| *B32B 5/16* | (2006.01) |
| *C09J 9/02* | (2006.01) |
| *C09J 11/04* | (2006.01) |
| *C09J 163/00* | (2006.01) |
| *C08K 3/08* | (2006.01) |
| *C08K 7/00* | (2006.01) |
| *H01R 4/04* | (2006.01) |

(52) U.S. Cl.
CPC ................ *H01B 1/02* (2013.01); *B32B 5/16* (2013.01); *C09J 9/02* (2013.01); *C09J 11/04* (2013.01); *C09J 163/00* (2013.01); *C08K 3/08* (2013.01); *C08K 7/00* (2013.01); *H01R 4/04* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 4,607,091 A | 8/1986 | Schreiber | |
| 5,021,484 A | 6/1991 | Schreiber et al. | |
| 5,200,452 A | 4/1993 | Schreiber | |
| 5,733,954 A | 3/1998 | McKenzie et al. | |
| 5,789,498 A | 8/1998 | Ohnishi et al. | |
| 5,798,399 A | 8/1998 | Griggs et al. | |
| 5,801,218 A | 9/1998 | McKenzie et al. | |
| 6,679,937 B1 * | 1/2004 | Kodas ...................... | B01J 2/003 106/287.19 |
| 7,829,188 B2 * | 11/2010 | Lin ......................... | B82Y 30/00 428/323 |
| 2009/0035553 A1 | 2/2009 | Yeh | |
| 2009/0294734 A1 | 12/2009 | Yang et al. | |

FOREIGN PATENT DOCUMENTS

| | | |
|---|---|---|
| EP | 1493780 A1 | 1/2005 |
| EP | 1594141 A1 | 11/2005 |
| JP | 62145601 A | 6/1987 |
| JP | 06295616 A | 10/1994 |
| JP | 07508555 A | 9/1995 |
| JP | 09157613 A | 6/1997 |
| JP | 1192625 A | 4/1999 |
| JP | 1192626 A | 4/1999 |
| JP | 2003016838 A | 1/2003 |
| JP | 2004197030 A | 7/2004 |
| JP | 2007269959 A | 10/2007 |
| JP | 2008172242 A | 7/2008 |
| WO | 2008048207 A2 | 4/2008 |
| WO | 2009092064 A2 | 7/2009 |
| WO | 2010093598 A2 | 8/2010 |

* cited by examiner

*Primary Examiner* — Sheeba Ahmed
(74) *Attorney, Agent, or Firm* — Steven C. Bauman

(57) ABSTRACT

The present invention relates to adhesives that are suitable for use as electrically conductive materials in the fabrication of electronic devices, integrated circuits, semiconductor devices, passive components, solar cells, solar modules, and/or light emitting diodes. The adhesives comprise at least one resin component, micron-sized electrically conductive particles having an average particle size of 2 μm to 50 μm, and from 0.01 to 15 wt. % of sub-micron-sized electrically conductive particles having a average particle size of 300 nm to 900 nm.

14 Claims, No Drawings

ELECTRICALLY CONDUCTIVE ADHESIVES

FIELD OF THE INVENTION

The present invention relates to adhesives that are suitable for use as electrically conductive materials in the fabrication of electronic devices, integrated circuits, semiconductor devices, passive components, solar cells, solar modules, and/or light emitting diodes.

BACKGROUND OF THE INVENTION

Electrically conductive materials are used for a variety of purposes in the fabrication and assembly of electronic devices, integrated circuits, semiconductor devices, passive components, solar cells, solar modules, light emitting diodes and/or piezoelectric actuators.

In general, electrically conductive adhesives (ECAs) provide a mechanical bond between two surfaces and conduct electricity. Typically, ECA formulations are made of a polymer resin filled with electrically conductive metal fillers. The resin generally provides a mechanical bond between two substrates, while the electrically conductive fillers generally provide the desired electrical interconnection.

For instance, WO 2008/048207 A2 discloses electrically conductive adhesive compositions having cured low modulus elastomer and metallurgically-bonded micron-sized metal particles and nano-sized metal particles. Said electrically conductive adhesive compositions often exhibit rather high processing viscosities, low storage stabilities and/or an insufficient electrical conductivity.

As electronic devices and the corresponding connecting areas between components and substrates are becoming continuously smaller, there is a need for electrically conductive materials, such as electrically conductive adhesives, that can provide an improved electrical interconnection between small contact areas.

Additionally, it would be desirable to provide ECAs, which exhibit an increased resistance to thermomechanical or mechanical fatigue, a low processing viscosity, and a low processing temperature. Moreover, a particular challenge with electrically conductive adhesives is implementing the appropriate balance of filler loading, adhesive strength, curing speed, electrical conductivity and stable electrical contact resistance.

Hence, there is a need for new electrically conductive adhesives that provide an improved electrically conductive interconnection between small contact areas, such as metallic electrodes, an increased resistance to thermomechanical or mechanical fatigue, a low processing viscosity, and a low processing temperature.

BRIEF SUMMARY OF THE INVENTION

The present invention provides an adhesive and the cured product of said adhesive which both have electrically conducting properties. The adhesive of the present can be cured in about 0.1 s to 180 minutes at a temperature within the range of about 50° C. to about 220° C. The adhesive exhibits a low processing viscosity, and a low processing temperature.

When cured, the cured product exhibits a good adhesion, a high electrical conductivity, and an increased resistance to thermomechanical or mechanical fatigue. Additionally, the cured product of the adhesive of the present invention allows to form an electrically conductive interconnection between two surfaces, wherein said interconnection exhibits a low and long-term stable electrical contact resistance.

The adhesive of the present invention comprises:
a) at least one resin component;
b) micron-sized electrically conductive particles having an average particle size of 2 μm to 50 μm, and
c) from 0.01 to 15 wt. % of sub-micron-sized electrically conductive particles having an average particle size of 300 nm to 900 nm.

The inventive adhesive is capable of forming an electrically conductive bond between two substrates and can be used in the fabrication and assembly of electronic devices, integrated circuits, semiconductor devices, passive components, solar cells, solar modules, and/or light emitting diodes.

The invention also provides a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the adhesive of the present invention.

DETAILED DESCRIPTION OF THE INVENTION

The term "resin component", as used in the present invention, refers to all thermosetting or thermoplastic resins that are present in the adhesive of the present invention. The term "thermosetting resin", as used herein, refers to any precursor which may be suitable for producing thermosetting plastics and/or thermosets such as, for example, monomers, oligomers or prepolymers made from natural or synthetic, modified or unmodified resins which are not fully cured and/or crosslinked, e.g., which are capable of being further cured and/or crosslinked using, e.g., (radical) polymerization, polycondensation and/or polyaddition reactions. Thermosetting resins can have a liquid form at 22° C. or they may be melted at relatively low temperatures, for example, below 100° C., to form liquids, which can occur without significant decomposition of the resin.

The term "thermoplastic resin", as used herein, refers to polymers which at 22° C., exist below their glass transition temperature if they are amorphous or below their melting point if they are crystalline. These polymers have the property of becoming soft when they are heated and of becoming rigid again when they are cooled, without there being an appreciable chemical change. As used herein, the term "thermoplastic resin" includes synthetic polyamides, polyesters, polyethers, polyacetals, block polyester ether copolymers, acrylonitrile butadiene styrene copolymers, polyacrylates, polybutylene terephtalates, polyolefines, such as polyethylene and/or polypropylene (co)polymers, polyimides, polyarylene oxides, polyalkylene oxides, polystyrenes, polyethersulfones, as well as mixtures, (block)copolymers or blends thereof.

For purposes of this invention, a thermoplastic resin is distinct from a thermosetting resin which solidifies via crosslinking or curing when subjected to heat and/or to a suitable curing agent.

The terms "curing" and "crosslinking", as used herein, can be understood to refer to reactions in which thermosetting resins and/or thermosetting resins and crosslinkers/curing agents are reacted to produce crosslinked or cured structures, which exhibit a higher molecular weight than the corresponding uncured thermosetting resins.

The term "electrically conductive particles", as used in the present invention, refers to any particulate material, which when added to a non-conductive resin component increases the electrical conductivity of the formed polymer composite. The electrically conductive particles can have different shapes, such a spherical, flake-like and/or dendritic shapes. Preferably, the electrically conductive particles used in the present are not nanowires or nanotubes.

As used herein, the term "average particle size" refers to the $D_{50}$ value of the cumulative volume distribution curve at which 50% by volume of the particles have a diameter less than said value. The average particle size or $D_{50}$ value is measured in the present invention through laser diffractometry preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or $D_{50}$ values relate to scattering measurements at an angle from 0.02 to 135 degrees relative to the incident laser beam.

In one embodiment of the present invention the resin component is selected from epoxy resins, benzoxazine resins, acrylate resins, bismaleimide resins, cyanate ester resins, polyisobutylene resins and/or combinations thereof.

The use of epoxy and/or benzoxazine resins in the present invention is advantageous, because these resins or the combination of said resins provide(s) a good mechanical strength, and/or a high thermal stability.

Suitable epoxy resins may include multifunctional epoxy-containing compounds, such as glycidyl ethers of $C_2$-$C_{28}$ diols, $C_1$-$C_{28}$ alkyl- or poly-phenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy resins suitable for use in the present invention are polyglycidyl derivatives of phenolic compounds, such as those available under the tradenames EPON 825, EPON 826, EPON 828, EPON 1001, EPON 1007 and EPON 1009 from Huntsman, Epiclon EXA 830 CRP, Epiclon EXA 850 CRP, Epiclon EXA 835 LVP from DIC, Epalloy 5000, Epalloy 5001, from CVC Chemicals, cycloaliphatic epoxy-containing compounds such as Araldite CY179 from Huntsman, Epalloy 5200 from CVC Chemicals or Celloxide 2021P from Daicel or waterborne dispersions under the tradenames EPI-REZ 3510, EPI-REZ 3515, EPI-REZ 3520, EPI-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayuku, Japan. Other suitable epoxy-containing compounds include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company, Epiclon N-740, Epiclon N-770, Epiclon N-775 from DIC and a waterborne dispersion ARALDITE PZ 323 from Huntsman.

Cresol analogs are also available commercially such as ECN 1273, ECN 1280, ECN 1285, and ECN 1299 or Epiclon N-660, Epiclon N-665, Epiclon N-670, Epiclon N-673, Epiclon N-680, Epiclon N-695 from DIC or waterborne dispersions ARALDITE ECN 1400 from Huntsman, Inc. SU-8 and EPI-REZ 5003 are bisphenol A-type epoxy novolacs available from Hexion.

Of course, combinations of different epoxy resins are also desirable for use herein.

It is particular preferred to use monofunctional glycidyl ethers, polyfunctional glycidyl ethers, and/or combinations thereof as the at least one resin component of the present invention, because these compounds allow to formulate adhesives of the present invention which exhibit a low processing viscosity, and/or an increased resistance to thermomechanical or mechanical fatigue.

Suitable benzoxazine resins may be embraced by the following structure:

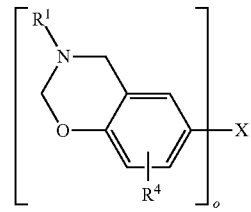

where o is 1 to 4, X is selected from a direct bond (when o is 2), alkyl (when o is 1), alkylene (when o is 2 to 4), carbonyl (when o is 2), oxygen (when o is 2), thiol (when o is 1), sulfur (when o is 2), sulfoxide (when o is 2), and sulfone (when o is 2), $R^1$ is selected from hydrogen, alkyl, alkenyl and aryl, and $R^4$ is selected from hydrogen, halogen, alkyl and alkenyl, or $R^4$ is a divalent residue creating a naphthoxazine residue out of the benzoxazine structure.

Alternatively, the benzoxazine resin may be embraced by the following structure:

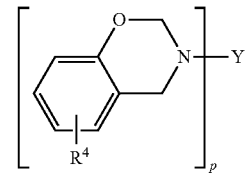

where p is 2, Y is selected from biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R^4$ is selected from hydrogen, halogen, alkyl and alkenyl, or $R^4$ is a divalent residue creating a naphthoxazine residue out of the benzoxazine structure.

Of course, combinations of different benzoxazine resins or combinations of different benzoxazine and epoxy resins are also desirable for use herein.

Benzoxazine compounds are presently available commercially from several sources, including Huntsman Advanced Materials; Georgia-Pacific Resins, Inc.; and Shikoku Chemicals Corporation, Chiba, Japan, If desired, however, instead of using commercially available sources, the benzoxazine may typically be prepared by reacting a phenolic compound, such as a bisphenol A, bisphenol F, bisphenol S or thiodiphenol, with an aldehyde and an aryl amine. See generally U.S. Pat. Nos. 4,607,091, 5,021,484, and 5,200,452.

In further embodiments of the present invention other resins, such as vinyl resins, phenolic resins, polyimide resins, silicon-containing resins, such as epoxy-silicone resins, and/or combinations thereof are used in combination or instead of the aforementioned resin components.

In a particular preferred embodiment the total weight of all resin components, such as the total weight of all epoxy resins and/or benzoxazine resins present in adhesive of the present invention is in the range of 3 to 25 percent by weight, preferably in the range of 5 to 18 percent by weight, and more preferably in the range of 6 to 15 percent by weight, each based on the total weight of the inventive adhesive.

The adhesive of the present invention further comprises micron-sized electrically conductive particles having an average particle size of 2 μm to 50 μm.

Using micron-sized electrically conductive particles having an average particle size of 2 μm to 50 μm in the adhesives of the present invention is advantageous, because said particles allow forming a stable and reliable electrical interconnection between two substrates, even if the surface area of said substrates is rather small.

Preferably, the micron-sized electrically conductive particles according to the present invention are selected from metal particles, metal plated particles or metal alloy particles and/or combinations thereof.

Said micron-sized electrically conductive particles preferably comprise or essentially consist of copper, silver, platinum, palladium, gold, tin, indium, aluminum or bismuth and/or combinations thereof. In a particular preferred embodiment micron-sized electrically conductive particles according to the present invention are used which essentially consist of silver.

The term "essentially consist of", as used herein, include electrically conductive particles which comprise non-intentionally added impurities, wherein the amount of said impurities is less than 0.2 wt. %, preferably less than 0.1 wt. %, and more preferably less than 0.01 wt. %, based on the total amount of the electrically conductive particles of the present invention.

The term "combination", as used herein, includes any alloy or any plated or coated metal combination of the aforementioned metals. Preferred plated or coated metal combinations include silver coated copper and silver coated aluminum.

In an alternative embodiment of the present invention, the micron-sized electrically conductive particles comprise or consist of carbon black, carbon fibers, graphite or metallic coated glass spheres and/or combinations thereof.

The average particle size of the micron-sized electrically conductive particles of the present invention is determined as described above. Preferably, the micron-sized electrically conductive particles have an average particle size of 3 μm to 20 μm, and most preferably of 4 μm to 10 μm.

The micron-sized electrically conductive particles may be present in an amount of 70 to 90 wt. %, based on the total weight of the adhesive of the present invention. By using an amount of 70 to 90 wt. % of said micron-sized electrically conductive particles in the adhesives of the present invention, cured products of said adhesives can be obtained, which exhibit a good conductivity, a low processing viscosity and a good adhesion.

In one embodiment of the present invention the micron-sized electrically conductive particles are present in an amount of 75 to 88 wt. %, and more preferably in an amount of 80 to 87 wt. %, each based on the total weight of the adhesive of the present invention.

In another embodiment of the present invention the micron-sized electrically conductive particles are present in an amount of 25 to 45 vol. % and more preferably in an amount of 30 to 44 vol. %, each based on the total volume of the adhesive of the present invention. Micron-sized electrically conductive particles are presently available commercially from several companies, such as Ferro Corp., Technic Inc., Ames Goldsmith Corp., Dowa Holdings Co., Ltd., Fukuda, Mitsui, and Metalor Technologies.

The adhesive of the present invention further comprises from 0.01 to 15 wt. % of sub-micron-sized electrically conductive particles having an average particle size of 300 nm to 900 nm. Preferably, the sub-micron-sized electrically conductive particles of the present invention are selected from metal particles, metal plated particles or metal alloy particles and/or combinations thereof.

The use of combinations of micron-sized and sub-micron sized electrically conductive particles in the adhesives of the present invention is advantageous because said adhesives exhibit a low processing viscosity and are capable of forming an improved electrically conductive interconnection between two substrates, wherein said interconnection has an increased resistance to thermomechanical or mechanical fatigue.

Sub-micron-sized electrically conductive particles having an average particle size of less than 300 nm are unsuitable for the present invention, because said particles significantly increase the processing viscosity of the resulting adhesive. In addition, the contact resistance of an electrically conductive interconnection formed by the cured product of said adhesive is increased in an undesirable manner.

Sub-micron-sized electrically conductive particles having an average particle size of more than 900 nm are also unsuitable for the present invention, because said particles increase the volume resistivity of the cured product.

The sub-micron-sized particles of the present invention preferably comprise or essentially consist of copper, silver, platinum, palladium, gold, tin, indium, aluminum or bismuth and/or combinations thereof. In a particular preferred embodiment sub-micron-sized electrically conductive particles according to the present invention are used which essentially consist of silver. Preferred plated or coated metal combinations include silver coated copper and silver coated aluminum.

The average particle size of the sub-micron-sized electrically conductive particles of the present invention is determined as described above. Preferably, the sub-micron-sized electrically conductive particles have an average particle size of 350 nm to 850 nm, more preferably of 370 nm to 820 nm, and most preferably 400 nm to 800 nm.

As noted above, the sub-micron-sized electrically conductive particles according to the present invention are present in the inventive adhesive in an amount from 0.01 to 15 wt. %, based on the total amount of said adhesive.

Using the sub-micron-sized electrically conductive particles in an amount of less than 0.01 wt. % causes an insufficient bulk conductivity of the cured product of the adhesive formulation.

In the case of high amounts of sub-micron-sized electrically conductive particles of more than 15 wt. % the resulting adhesive formulations are unsuitable for the intended applications, because said formulations are often not homogeneous and exhibit an insufficient bulk conductivity and/or an increased processing viscosity.

Preferably, the sub-micron-sized electrically conductive particles according to the present invention are present in the inventive adhesive in an amount of 0.5 to 7.5 wt. %, and most preferably in an amount of 0.75 to 2.0 wt. %, each based on the total amount of the inventive adhesive.

In one embodiment it is advantageous to use said sub-micron-sized electrically conductive particles in an amount of 0.75 to 2.0 wt. % in the adhesives of the present invention, because the resulting adhesives exhibit a very low processing viscosity and the cured products thereof form interconnections having a very low contact resistance.

In another embodiment sub-micron-sized electrically conductive particles having a tap density of 5.2 g/cm$^3$ to 7.0 g/cm$^3$, more preferably of 5.4 g/cm$^3$ to 6.5 g/cm$^3$, and most preferably of 5.6 g/cm$^3$ to 6.0 g/cm$^3$ can be used to prepare adhesives of the present invention, which comprise high loading of sub-micron-sized electrically conductive particles, such as a loading of 7.5 to 15 wt. %, based on the total amount of the adhesive.

The tap density is determined in accordance to ISO 3953:1993. The principle of the method specified is tapping a specified amount of powder in a container by means of a tapping apparatus until no further decrease in the volume of the powder takes place. The mass of the powder divided by its volume after the test gives its tap density.

Sub-micron-sized electrically conductive particles are presently available commercially from several companies, including Ferro Corp., Technic Inc., Ames Goldsmith Corp., Dowa Holdings Co., Ltd., Fukuda, Mitsui, and Metalor Technologies.

In certain embodiments the micron-sized electrically conductive particles and the sub-micron-sized electrically conductive particles according to the present invention are selected from metal particles, metal plated particles or metal alloy particles and/or combinations thereof.

Preferably, the micron-sized electrically conductive particles and the sub-micron-sized electrically conductive particles according to the present invention comprise or essentially consist of the same metal, such as copper, silver, platinum, palladium, gold, tin, indium, aluminum or bismuth and/or combinations thereof. More preferably, said micron-sized electrically conductive particles and said sub-micron-sized electrically conductive particles both essentially consist of silver.

In the adhesive of the present invention the following different combinations of electrically conductive particles according to the present invention can preferably be used:

from 70 to 90 wt. % of micron-sized electrically conductive particles having an average particle size of 2 μm to 50 μm and from 0.01 15 wt. % of sub-micron-sized electrically conductive particles having an average particle size of 300 nm to 900 nm;

from 70 to 90 wt. % of micron-sized electrically conductive particles having an average particle size of 3 μm to 20 μm and from 0.01 to 10 wt. % of sub-micron-sized electrically conductive particles having an average particle size of 350 nm to 850 nm;

from 70 to 90 wt. % of micron-sized electrically conductive particles having an average particle size of 4 μm to 15 μm and from 0.01 to 7.5 wt. % of sub-micron-sized electrically conductive particles having an average particle size of 370 nm to 820 nm;

from 70 to 90 wt. % of micron-sized electrically conductive particles having an average particle size of 5 μm to 10 μm and from 0.01 to 5 wt. % of sub-micron-sized electrically conductive particles having an average particle size of 400 nm to 800 nm;

from 75 to 88 wt. % of micron-sized electrically conductive particles having an average particle size of 3 μm to 20 μm and from 0.1 to 2.5 wt. % of sub-micron-sized electrically conductive particles having an average particle size of 350 nm to 850 nm;

from 80 to 87 wt. % of micron-sized electrically conductive particles having an average particle size of 4 μm to 15 μm and from 0.5 to 2.0 wt. % of sub-micron-sized electrically conductive particles having an average particle size of 370 nm to 820 nm; or from 80 to 87 wt. % of micron-sized electrically conductive particles having an average particle size of 5 μm to 10 μm and from 0.75 to 1.5 wt. % of sub-micron-sized electrically conductive particles having an average particle size of 400 nm to 800 nm.

All amounts given above are based on the total amount of the adhesive of the present invention.

It is further on preferred that in all of the aforementioned combinations the micron-sized electrically conductive particles and the sub-micron-sized electrically conductive particles comprise or essentially consist of silver or copper.

An electrically conductive interconnection between two surfaces, such as metallic electrodes, having a particularly low and long-term stable contact resistance can be realized by using an adhesive of the present invention, which has a weight ratio of micron-sized electrically conductive particles to sub-micron-sized electrically conductive particles is from 100:0.1 to 100:21, preferably from 100:0.5 to 100:9 and more preferably from 100:0.8 to 100:2.8.

Depending on the at least one resin component used in the adhesive of the present invention it might be useful to include at least one additional curing agent to initiate and/or accelerate the curing process. For epoxy resins curing agents can be selected from nitrogen-containing curing agents, such as primary and/or secondary amines.

In one embodiment of the present invention the curing agent is selected from primary or secondary amines which show blocked or decreased reactivity. The definition "primary or secondary amines which show blocked or decreased reactivity" shall mean those amines which due to a chemical or physical blocking are incapable or only have very low capability to react with the resin components, but may regenerate their reactivity without reacting with a chemical reactant which would cleave a protective group. These properties may be inherent to the amines due to physical or chemical conditions.

Primary or secondary amines which show blocked or decreased reactivity can be chemically or physically encapsulated. After liberation of the amine, e.g. by melting it at increased temperatures, by removing sheath or coatings, by the action of pressure or of supersonic waves or of other energy types, the curing reaction of the resin components starts. In a preferred embodiment of the present invention the curing agent is selected from heat-activatable curing agents.

Examples of heat-activatable curing agent include complexes of at least one organoborane or borane with at least one amine. The amine may be of any type that complexes the organoborane and/or borane and that can be decomplexed to free the organoborane or borane when desired. The amine may comprise a variety of structures, for example, any primary or secondary amine or polyamines containing primary and/or secondary amines. The organoborane can be selected from alkyl boranes. A particular preferred borane is boron trifluoride ($BF_3$).

Suitable amine/(organo)borane complexes are available from commercial sources such as King Industries, Air products, and ATO-Tech.

Other heat-activatable curing agents include guanidines, substituted guanidines, substituted ureas, melamine resins, guanamine derivatives, cyclic tertiary amines, aromatic amines and/or mixtures thereof.

In one embodiment of the invention the heat-activatable curing agent is selected from amine-epoxy adducts. Amine-epoxy adducts are well-known in the art and are described, for example, in U.S. Pat. Nos. 5,733,954, 5,789,498, 5,798,399 and 5,801,218, each of which is incorporated herein by reference in its entirety. Such amine-epoxy adducts are the products of the reaction between one or more amine compound(s) and one or more epoxy compound(s). Carboxylic acid anhydrides, carboxylic acids, phenolic novolac resins, water, metal salts and the like may also be utilized as additional reactants in the preparation of the amine-epoxy adduct or to further modify the adduct once the amine and epoxy have been reacted.

Suitable amine-epoxy adducts are available from commercial sources such as Ajinomoto, Inc., Air products, Adeka, Asahi Denka Kogyo K.K., and the Asahi Chemical Industry Company Limited. The products sold by Ajinomoto under the trademark AJICURE and by Air Products under the trademark AMICURE or ANCAMINE are especially preferred for use in the present invention.

Among the commercially available amine-epoxy adducts suitable for use in the present invention are Ajicure PN-H, Ajicure PN-23(J), Ajicure PN-40(J), Ajicure PN-50(J), Ajicure PN-31, Amicure 2014 AS, Amicure 2014 FG, Amicure 2337S, Amicure 2441, Amicure 2442, Ajicue MY-24, Ajicure MY-H, Ajicure MY-23, Adeka Hardener EH 4360S, Adeka Hardener EH 4370S, Adeka Hardener EH 3731S, and Adeka Hardener EH 4357S.

Of course, combinations of different heat-activatable curing agents, such as combinations of different amine-epoxy adducts and/or combinations amine/(organo)borane complexes are also desirable for use herein.

The at least one curing agent, such as at least one nitrogen-containing curing agent may be present in the inventive adhesive in an amount in the range of 0.1 to 50 parts per hundred (pph), preferably in an amount in the range of 0.2 to 25 pph, and more preferably in an amount in the range of 1 to about 20 pph, each based on the adhesive of the present invention.

In another embodiment the adhesive of the present invention further comprises one or more additives, such as plasticizers, oils, stabilizers, antioxidants, anti-corrosion agents, chelating agents, pigments, dyestuffs, polymeric additives, defoamers, preservatives, thickeners, rheology modifiers, humectants, adhesion promoters, dispersing agents, and water.

When used, additives are used in an amount sufficient to provide the desired properties. At least one additive may be present in the inventive adhesive in an amount in the range of about 0.05 to about 10 wt. %, preferably in an amount in the range of about 1 to about 5 wt. %, and more preferably in an amount in the range of about 2 to about 4 wt. %, each based on the total weight of the inventive adhesive. Of course, combinations of different additives are also desirable for use herein.

One typical formulation of the inventive adhesive comprises:
a) from 3 to 25 wt. % of at least one resin component,
b) from 70 to 90 wt. % of micron-sized electrically conductive particles having an average particle size of 2 μm to 50 μm,
c) from 0.01 to 15 wt. % of sub-micron-sized electrically conductive particles having an average particle size of 300 nm to 900 nm,
d) from 0 to 5 wt. % of at least one curing agent, and
e) from 0 to 5 wt. % of at least one additive.

All amounts given above are based on the total amount of the adhesive of the present invention.

The inventive adhesive, which is an electrically conductive adhesive, can find use as lead-free solder replacement technology, general interconnect technology, die attach adhesive, and so forth. Electronic devices, integrated circuits, semiconductor devices, solar cells and/or solar modules and other devices employing the present adhesive may be used in a wide variety of applications throughout the world, including energy production, personal computers, control systems, telephone networks, automotive electronics, displays, semiconductor packages, passive devices, and handheld devices.

When cured, the cured product of the adhesive forms a stable electrical conductive interconnection between two surfaces, wherein said interconnection provides a good resistance to thermomechanical or mechanical fatigue and a high electrical conductivity and low contact resistance.

A further aspect of the present invention is the cured product of the inventive adhesive. The adhesive of the present can be cured in about 0.1 s to 180 minutes at a temperature within the range of about 50° C. to about 250° C., preferably within the range of about 70° C. to about 220° C., and more preferably within the range of about 90° C. to about 200° C.

In a preferred embodiment the inventive adhesive is cured at 120° C. to 180° C. in less than 180 minutes, preferably less than 60 minutes, and more preferably less than 15 minutes. The curing of the inventive adhesive can be performed by heating the formulation, e.g. by using IR lamps or conventional heating techniques.

Another aspect of the present invention is a bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of the adhesive of the present invention.

The term "substrate", as used herein, preferably refers to an electrode, wherein the inwardly facing surface of the electrode is in contact with the cured product of the adhesive of the present invention.

In one embodiment of the present invention at least one inwardly facing surface has a surface area of less than 5000 $\mu m^2$, preferably less than 1000 $\mu m^2$, and more preferably less than 100 $\mu m^2$. Preferably, the inwardly facing surfaces of both substrates have a surface area of less than 5000 $\mu m^2$, preferably less than 1000 $\mu m^2$ and more preferably less than 100 $\mu m^2$.

The term "surface area", as used herein, refers to the total surface area based on the macroscopic dimensions of the surface, wherein the roughness of the surface is neglected.

It is a particular advantage of the present invention that the cured product of the adhesive can form a stable electrically conductive interconnection having a low contact resistance between the inwardly facing surfaces of two substrates, such as two electrodes, even if the contact area of one or both inwardly facing surfaces is small, which means that the surface area of the inwardly facing surface is less than 5000 μm², preferably less than 1000 μm², and more preferably less than 100 μm².

At least one of the substrates can be selected from metals, such as metal firing pastes, aluminum, tin, molybdenum, silver, and conductive metal oxides such as indium tin oxide (ITO), fluorine doped tin oxide, aluminum doped zinc oxide etc. Further suitable metals include copper, gold, palladium, platinum, aluminum, indium, silver coated copper, silver coated aluminum, tin, and tin coated copper. Preferably both substrates are selected from one of the aforementioned materials.

EXAMPLES

Different adhesives according to the invention and comparative formulations were made by using the following components:

| Resin component | |
|---|---|
| Epoxy resin 1 | Epalloy 5000 from Emerald Materials (Diepoxide of a cycloaliphatic alcohol of Bisphenol A); |
| Epoxy resin 2 | Epalloy 5200 from Emerald Materials (Cycloaliphatic epoxy resin); |
| Electrically conductive particles | |
| Micron-sized electrically conductive particles 1 | AA 1922 from Metalor Technologies (Micron-sized electrically conductive silver particles having a volume average particle size $(D_{50})^{[a]}$ between 2 μm and 50 μm); |
| Micron-sized electrically conductive particles 2 | P318-18 from Metalor Technologies (Micron-sized electrically conductive silver particles having a volume average particle size $(D_{50})^{[a]}$ between 2 μm and 20 μm); |
| Sub-micron-sized electrically conductive particles 1 (SMSP 1) | S-3-500 from Ames Goldsmith Corp (Sub-micron-sized electrically conductive silver particles having a volume average particle size $(D_{50})^{[a]}$ between 300 nm and 500 nm); |
| Sub-micron-sized electrically conductive particles 2 (SMSP 2) | P432-38 from Metalor Technologies (Sub-micron-sized electrically conductive silver particles having a volume average particle size $(D_{50})^{[a]}$ between 300 and 400 nm); |
| Nano-sized electrically conductive particles (NSP 1) | Ag6V from Metalor Technologies SA (Nano-sized electrically conductive silver particles having a volume average particle size $(D_{50})^{[a]}$ between 20 nm and 40 nm); |
| Nano-sized electrically conductive particles (NSP 2) | S2-80 from Ames Goldsmith Corp. (Nano-sized electrically conductive particles having a volume average particle size $(D_{50})^{[a]}$ of 80 nm); |
| Nitrogen-containing curative | Boron trifluoride amine complex |
| Diluent or solvent | Butyl glycol acetate |

[a]Volume average particle sizes ($D_{50}$) were determined by laser diffractometry as described in the description The adhesives of the present invention and comparative formulations were prepared by simply mixing the aforementioned components.

The components of the adhesive 1 and 4 to 10 and of the comparative formulations 2, 3 and 11 are given in Table 1 in amounts based on w/w of the composition.

The adhesive formulation and the cured products of the adhesive formulations were characterized using the following analytical methods:

Appearance

The appearance was evaluated on the basis of a visual examination using the naked eye without visual magnification or enhancement. A sample is regarded as being homogeneous if no particulate material can be identified in the formulation.

Viscosity

The viscosity was measured at 25° C. using an AR 1000 rheometer from TA instruments. For the measurement, a 2 cm plate geometry and a 200 micron gap was used. The shear rate applied was 15 s$^{-1}$.

Volume Resistivity

The volume resistivity was determined in the following manner: aliquots of the prepared formulations were drawn down the surface of glass slides giving strips with strip dimensions of 5 cm length, 5 mm width and approximately 50 micron thickness and then heated in an oven for 30 minutes at 180° C. to cure. After curing the strips were approximately 0.005 to 0.03 cm thick. Resistance was determined by measuring the voltage (V) drop along a 5 cm strip while passing current (I) through the strip, (R=V/I). Three separate strips were prepared and measured for resistance and dimensions. The volume resistivity (Rv) was calculated for each strip using the formula Rv=(R(w)(t)/L) where R is the electrical resistance of the sample in ohms measured using an ohmmeter or equivalent resistance measuring device, w and t are the width and thickness of the sample, in centimeters, and L is the distance in centimeters between the electrical conductors of the resistance measuring device. Volume resistivity units are reported in Ohm·cm.

Contact Resistance

The electrical contact resistance was measured on a ceramic test board with 100 Au finished electrodes. The electrodes have a width of 40 μm and are spaced apart 140 microns of each other. Between the electrodes a 40 μm thick polymer layer is applied to create a via area that the formulations need to fill to contact the electrodes at the bottom. The formulation was applied with a thickness of 200 μm and a width of approximately 2 mm across the length of the test board. The formulation was heated in an oven for 30 minutes at 180° C. to cure. After curing and cooling down to 20° C. the electrical contact resistance was measured across 50 pairs of electrodes. The average contact resistance (arithmetic average) is reported in mOhm.

Table 2 denotes the properties of the (cured) formulations of Table 1. The viscosity and the appearance of the formulation and the comparative formulation were evaluated. In addition, the electrically conducting properties of the cured products of the formulations and the cured products of the comparative formulations were evaluated by determining the volume resistivity and contact resistance.

TABLE 1

Electrically conductive adhesives and comparative formulations

|  | 1 | 2[b] | 3[b] | 4 | 5 | 6 | 7 | 8 | 9 | 10 | 11[b] |
|---|---|---|---|---|---|---|---|---|---|---|---|
| Epoxy resin 1 | 8.63 | 8.61 | 8.61 | 8.61 | 8.63 | 8.63 | 9.6 | 9.6 | 9.6 | 9.6 | 9.6 |
| Epoxy resin 2 | 2.16 | 2.15 | 2.15 | 2.15 | 2.15 | 2.15 | 2.4 | 2.4 | 2.4 | 2.4 | 2.4 |
| Micron size conductive particles 1 | 84.91 | 84.73 | 84.73 | 84.73 | 86 | 81.7 | — | — | — | — | — |
| Micron size conductive particles 2 | — | — | — | — | — | — | 80.0 | 77.5 | 75.0 | 70.0 | 65 |
| SMSP 1 | 1.82 | — | — | — | — | — | — | — | — | — | — |
| NSP 1 | — | 1.82 | — | — | — | — | — | — | — | — | — |
| NSP 2 | — | — | 1.82 | — | — | — | — | — | — | — | — |
| SMSP 2 | — | — | — | 1.82 | 0.5 | 1.7 | 5.0 | 7.5 | 10.0 | 15.0 | 20.0 |
| Nitrogen-containing curative | 0.81 | 0.81 | 0.81 | 0.81 | 0.81 | 0.81 | 0.9 | 0.9 | 0.9 | 0.9 | 0.9 |
| Diluent | 1.68 | 1.88 | 1.88 | 1.88 | 1.88 | 1.87 | 2.1 | 2.1 | 2.1 | 2.1 | 2.1 |

[b]Comparative formulation

TABLE 2

Properties of the (cured) formulations of Table 1

|  | 1 | 2[b] | 3[b] | 4 | 5 | 6 | 7 | 8 | 9 | 10 | 11[b] |
|---|---|---|---|---|---|---|---|---|---|---|---|
| Appearance | homogenous | Not Homogenous | Not Homogenous | homogenous | homogenous | homogenous | homogenous | homogenous | homogenous | homogenous | Not Homogenous |
| Viscosity [Pa s] | 11.8 | 28 | 26.4 | 27.4 | 22 | 5.7 | 5.0 | 6.3 | 7.5 | 24.8 | 13.5 |
| Volume resistivity [Ohm · cm] | 2.77E−05 | 2.96E−05 | 2.19E−05 | 4.35E−05 | 2.49E−05 | 4.84E−05 | 7.76E−05 | 7.19E−05 | 1.02E−04 | 1.09E−04 | 1.5E−04 |
| Contact resistance [mOhm] | 427 | 2922073 | 153036 | 576 | 574 | 496 | 424 | 457 | 396 | 445 | 420 |

[b]Comparative formulation

Table 2 shows that the comparative formulations comprising nano-sized electrically conductive particles having an average particle size of less than 300 nm (examples 2 and 3) are inhomogeneous and the contact resistance of electrically conductive interconnections formed by the cured product of said formulations is significantly increased.

In addition Table 2 shows, that non-homogeneous formulations (comparative formulation 11) were obtained when using an amount of sub-micron-sized electrically conductive particles of more than 15 wt. %.

The invention claimed is:

1. An adhesive, comprising:
   a) at least one resin component;
   b) from 70 to 90 wt % of electrically conductive particles having an average particle size of 2 μm to 50 μm, and
   c) from 0.01 to 15 wt. % of electrically conductive particles having an average particle size of 300 nm to 900 nm, wherein the wt. % is based on the total amount of the adhesive and wherein the electrically conductive particles of a), b) or a) and b) are selected from metal particles, metal plated particles or metal alloy particles and combinations thereof, and wherein the weight ratio of electrically conductive particles of b) to electrically conductive particles of c) is from 100:0.1 to 100:21.

2. The adhesive according to claim 1, wherein the resin component is selected from thermosetting resins and/or thermoplastic resins.

3. The adhesive according to claim 1, wherein the resin component is selected from epoxy resins, benzoxazine resins, acrylate resins, bismaleimide resins, cyanate ester resins, polyisobutylene resins and/or combinations thereof.

4. The adhesive according to claim 3, wherein the epoxy resin is selected from monofunctional glycidyl ethers, polyfunctional glycidyl ethers, and/or combinations thereof.

5. The adhesive according to claim 1, wherein the electrically conductive particles comprise copper, silver, platinum, palladium, gold, tin, indium, aluminum or bismuth, and combinations thereof.

6. The adhesive according to claim 1, wherein the electrically conductive particles comprise the same metal, which is silver or copper.

7. The adhesive according to claim 1, wherein the electrically conductive particles of b) have an average particle size of 2 μm to 20 μm.

8. The adhesive according to claim 1, wherein the electrically conductive particles of c) have an average particle size of 400 nm to 800 nm.

9. The adhesive according to claim 1, wherein the adhesive comprises the electrically conductive particles of c) in an amount of 0.5 to 7.5 wt. %, based on the total amount of the adhesive.

10. The adhesive according to claim 1 wherein the adhesive comprises the electrically conductive particles of c) in an amount of 0.75 to 2 wt. %, based on the total amount of the adhesive.

11. The adhesive according to claim 1, wherein the adhesive additionally comprises at least one curing agent.

12. A cured product of the adhesive according to claim 1.

13. A bonded assembly comprising two substrates aligned in a spaced apart relationship, each of which having an inwardly facing surface and an outwardly facing surface, wherein between the inwardly facing surfaces of each of the two substrates an electrically conductive bond is formed by the cured product of claim 12.

14. A bonded assembly according to claim 13, wherein at least one inwardly facing surface has a surface area of less than 5000 $\mu m^2$.

* * * * *